United States Patent [19]

Iizuka et al.

[11] 3,958,098

[45] May 18, 1976

[54] APPARATUS FOR AUTOMATIC AND VERTICAL FILLET WELDING

[75] Inventors: Shimpei Iizuka; Keiichi Ishimoto; Katsumi Ishimoto, all of Yokosuka, Japan

[73] Assignee: Sumitomo Shipbuilding & Machinery Co., Ltd., Tokyo, Japan

[22] Filed: Sept. 3, 1974

[21] Appl. No.: 503,048

[52] U.S. Cl............................ 219/126; 219/124; 219/125 R; 219/125 PL; 254/93 R
[51] Int. Cl.²............................................ B23K 9/12
[58] Field of Search.......... 219/124, 125 R, 125 PL, 219/126, 60 R; 254/93 R, 93 VA

[56] References Cited
UNITED STATES PATENTS

| | | | |
|---|---|---|---|
| 2,440,696 | 5/1948 | Patterson | 219/125 R |
| 2,868,502 | 1/1959 | Viebke | 254/93 R |
| 3,068,351 | 12/1962 | Longenecker et al. | 219/124 |
| 3,229,883 | 1/1966 | Yost | 219/126 X |
| 3,453,411 | 7/1969 | De Coninck Van Noyen | 219/60 R X |
| 3,734,464 | 5/1973 | Bushnell | 254/93 R |
| 3,843,866 | 10/1974 | Kensrue | 219/124 |

Primary Examiner—Arthur T. Grimley
Assistant Examiner—N. D. Herkamp
Attorney, Agent, or Firm—Holman & Stern

[57] ABSTRACT

The invention relates to an apparatus for automatic fillet welding. The apparatus has a runnable motor-driven carriage which carries a multi-stage telescopic unit which mounts a lateral slide unit mounting in turn a longitudinal slide. A welding head having three welding torches mounted on tip end of the longitudinal slide through a complex type fine adjusting mechanism assembly. The telescopic unit is controlled by a hydraulic pump circuit which is controlled in turn by means of an automatic electric circuit.

13 Claims, 24 Drawing Figures

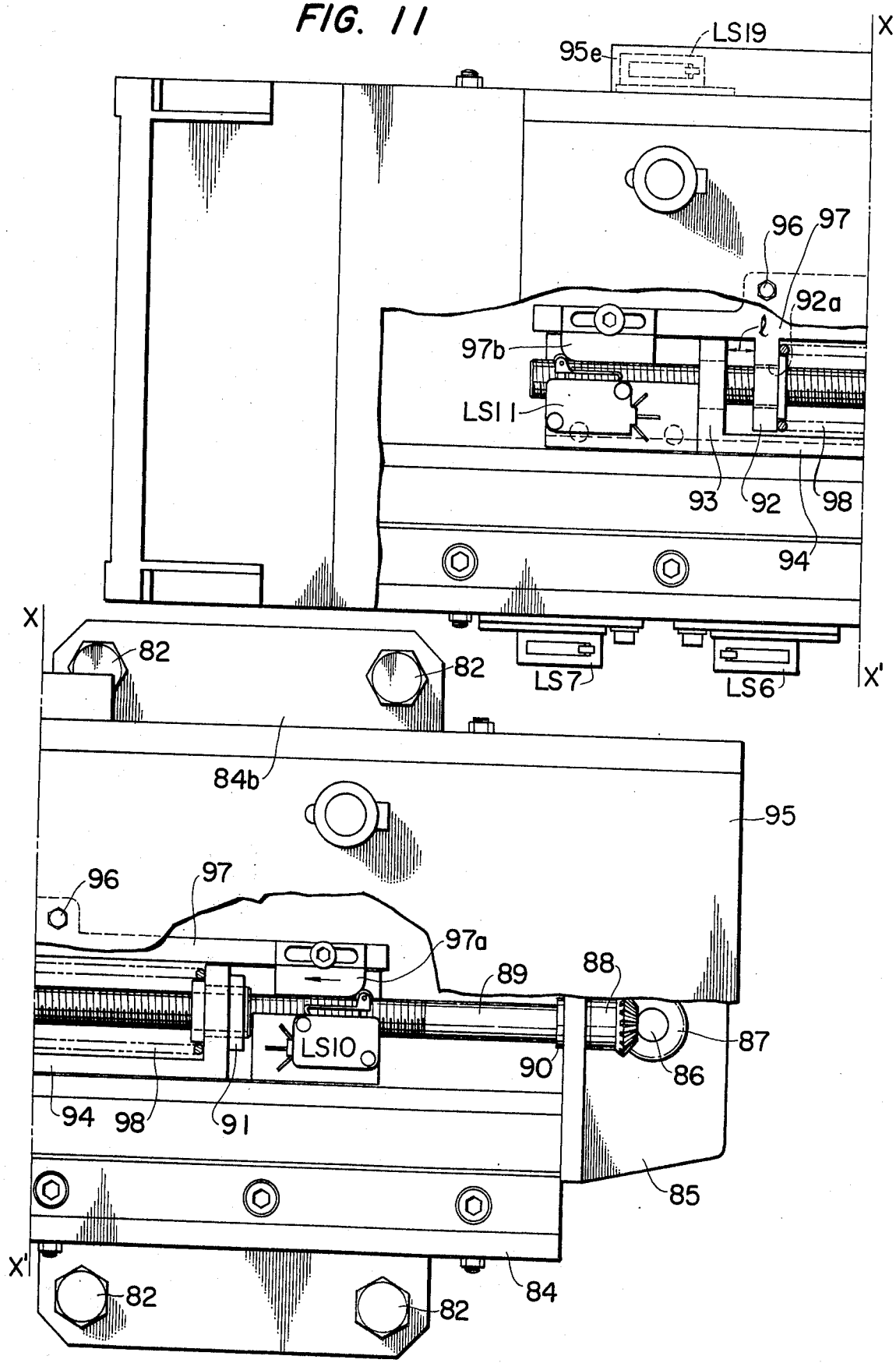

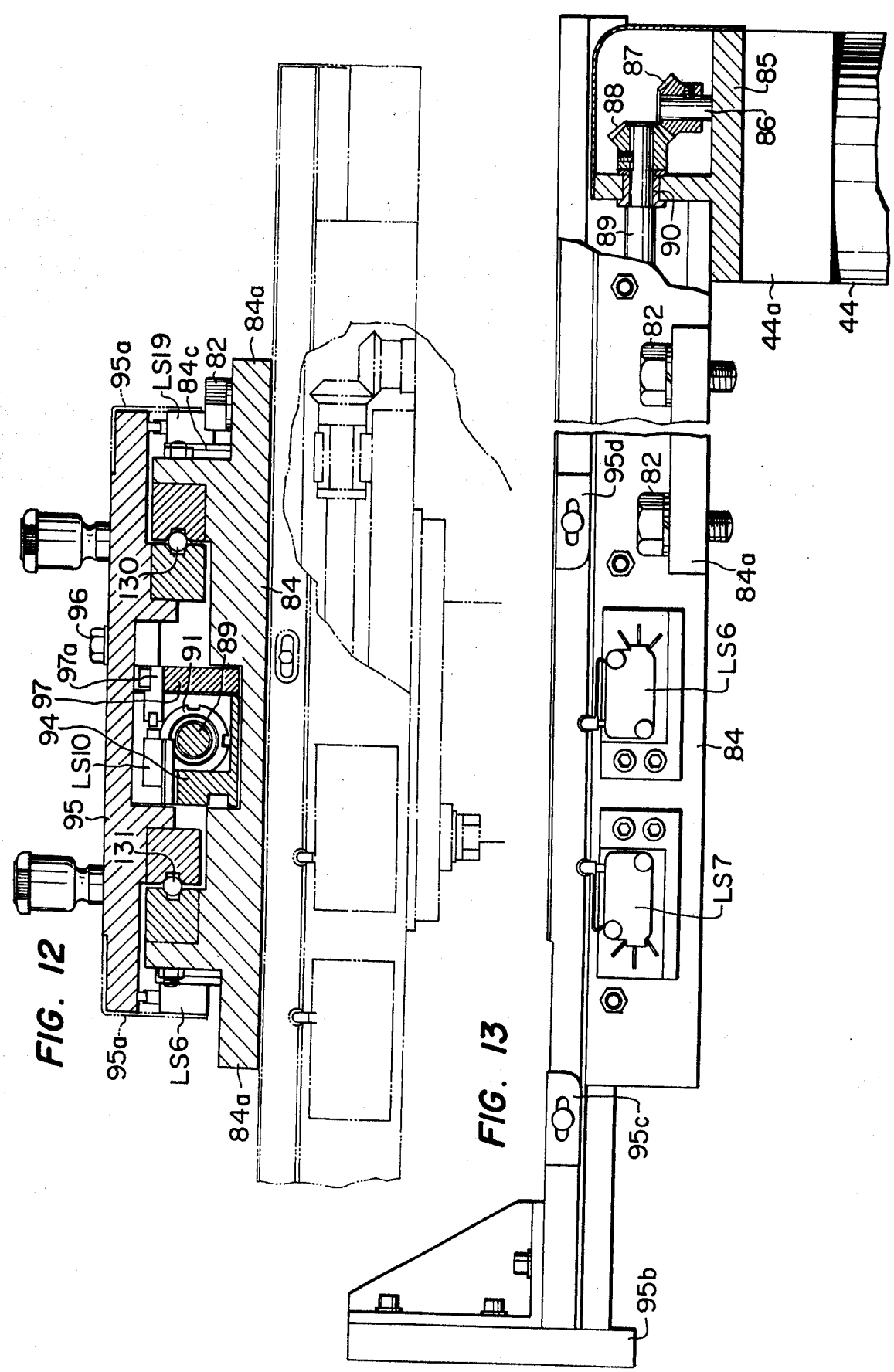

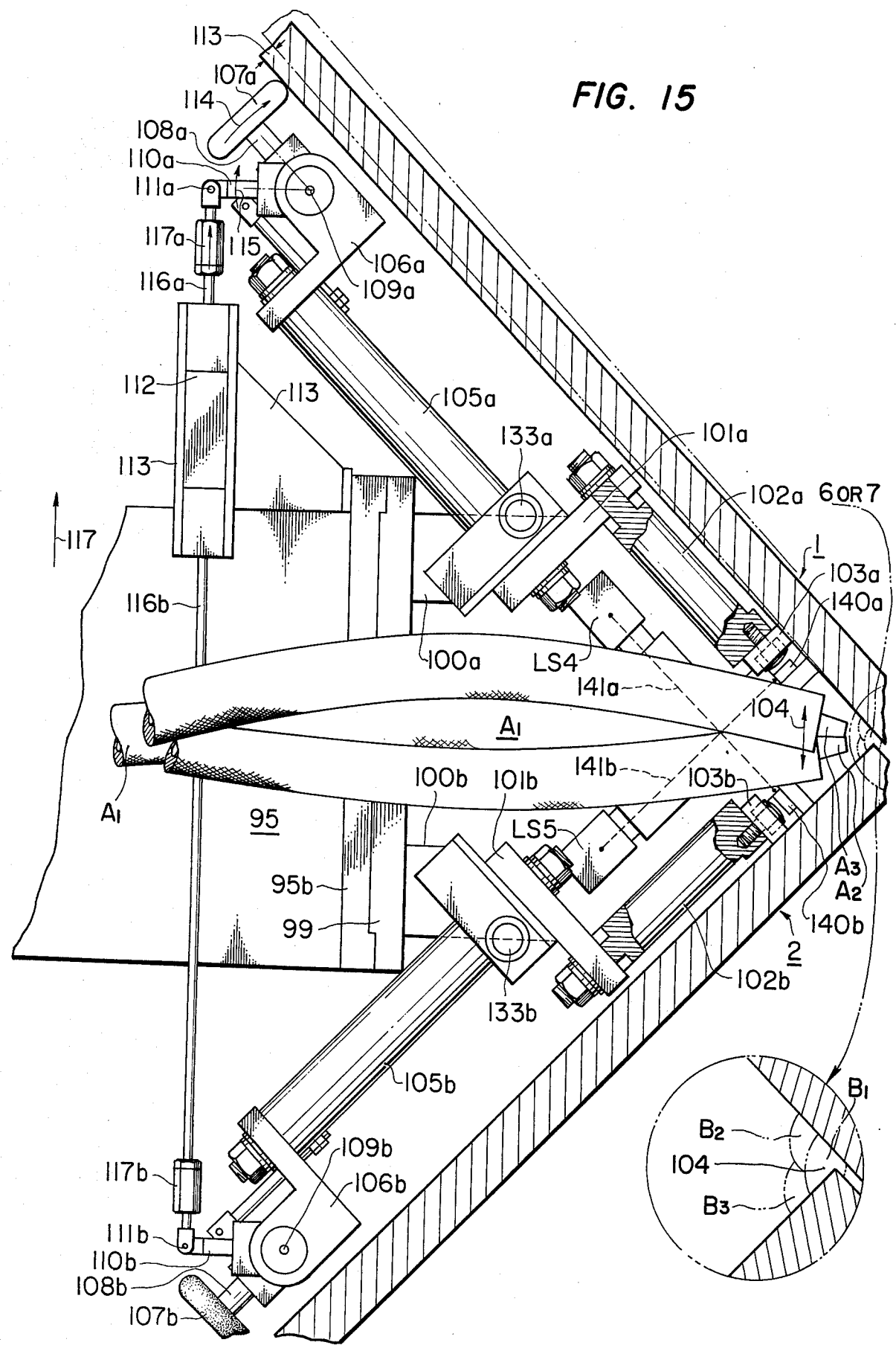

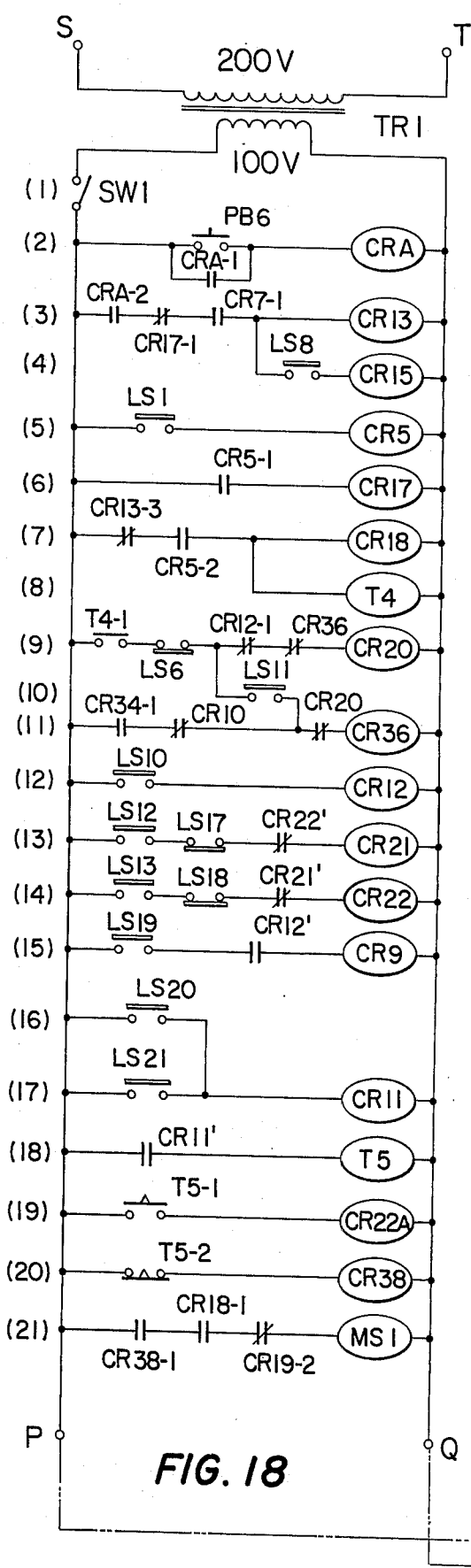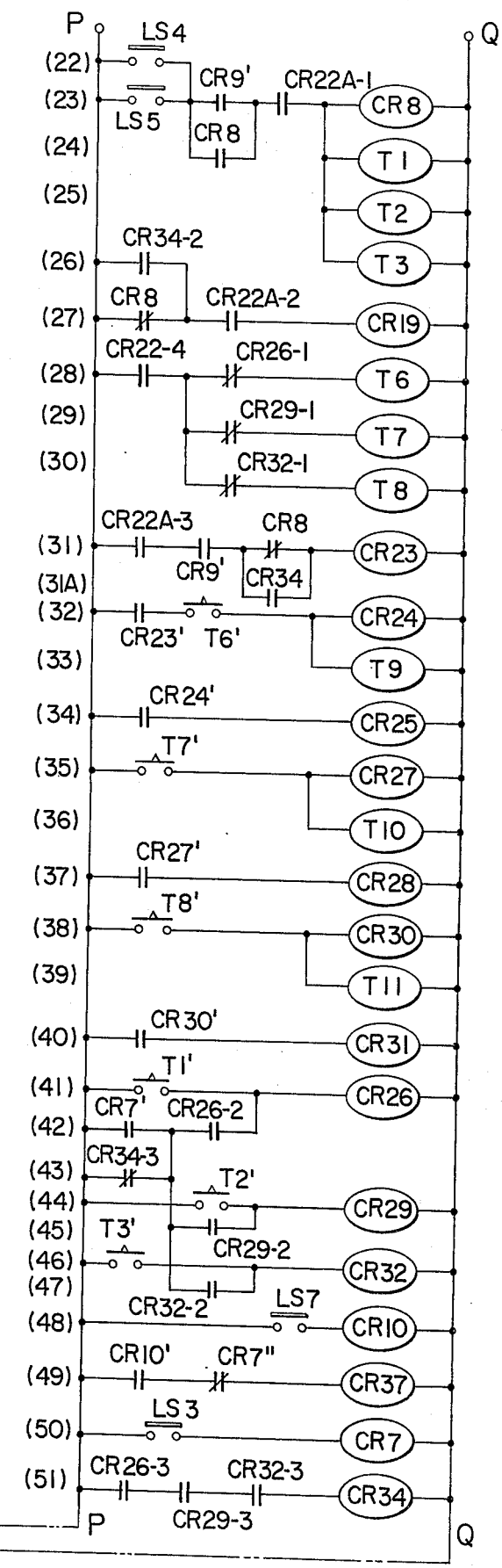
FIG. 18

APPARATUS FOR AUTOMATIC AND VERTICAL FILLET WELDING

BACKGROUND OF THE INVENTION

This invention relates to a novel apparatus for carrying out automatic vertical, high speed fillet welding.

Previously, the automatic vertical fillet welding was generally carried out in an upwardly advancing method without use of any protecting gas. In rare cases, however, the automatic vertical fillet welding was proposed, at least theoretically, relying upon the downwardly advancing method using carbon dioxide gas as a protecting or atmospheric gas. In the part according to our experience, depth of weld was only about several millimeters at the most, thus the welding strength was too weak for welding mother plates, having a thickness of 25 mm for example, since frequently there are disadvantageous lack of fusion of penetration and the welded structures could prove to be defective. A proposal for remedying this problem resides in an upwardly advancing automatic fillet welding process without use of any protecting gas and the welding torch being reciprocated in the lateral directions for providing sufficient weld metal. This proposal has been met, however, with a highly retarded welding speed for even minimum deposition lengths such as 10 millimeters.

In order to achieve downward-advancing fillet welding, it has already been proposed to mount a lateral slide unit on a telescopically extendable and retractable unit carried by a runnable or vehicular carriage, and to mount a welding head comprising a plurality of, preferably three, welding torches, on a longitudinal slide unit which is mounted on said lateral slide unit.

SUMMARY OF THE INVENTION

It is an object of the present invention to provide an automatic mechanism for uniformly extending and retracting a telescopic support unit adapted for use on the vertical welding apparatus of the above kind.

A further object is to provide a welding apparatus of the above kind, having an improved control mechanism for maintaining a telescopic support at a descending speed of a substantially constant value so that a welding head is adapted for the uniform downwardly effected fillet welding procedures.

Still a further object is to provide a welding apparatus of the above kind wherein the welding torches are automatically directed towards a vertical welding area through unique mechanical and electric controls.

It is still a further object to provide an automatic downward advancing welding apparatus of the above kind which is provided with such means as keeping the extended telescopic unit in an extended upright position adapted for execution of the subsequent vertical and decending fillet welding job.

The invention resides in its broadest sense in means for attaining an automatic, downwardly advancing fillet welding, characterized by a plurality of welding torches arranged at several different heights being caused to move at a constant speed in successive orders, so as to conjointly provide a weld joint during a single pass.

These and further objects, features and advantages of the invention will become more apparent as the description proceeds by reference to the accompanying drawings in which:

BRIEF DESCRIPTION OF THE DRAWINGS

FIG. 5 is an end view of the carriage shown in FIG. 4, wherein, however, the telescopic unit is shown in its retracted position in full line and in its extended position in phantom line, respectively.

FIG. 11 is a partially broken-away top plan view of a longitudinal slide unit mounted on said lateral slide unit, wherein, however, the longitudinal unit is shown in two parts which represents, jointly, a single figure by overlapping the section lines X — X' with each other.

FIG. 12 is a cross section of the longitudinal slide unit taken along the section line X — X' shown in FIG. 12, wherein, however, the related parts of the lateral slide unit are shown in phantom and partially broken away.

FIG. 13 is a partially broken-away and sectioned side elevation of the longitudinal slide unit.

FIG. 15 is a partially sectioned plan view of the welding head shown in FIG. 14, being illustrated on somewhat larger scale than in the latter and in its operating position relative to the welding gap formed between the longitudinal and transversal structural members.

FIGS. 18 – 21 represents jointly an electrical control circuit operatively connected to the automatic welder according to the present invention.

DETAILED DESCRIPTION OF THE PREFERRED EMBODIMENTS

Figure 1:
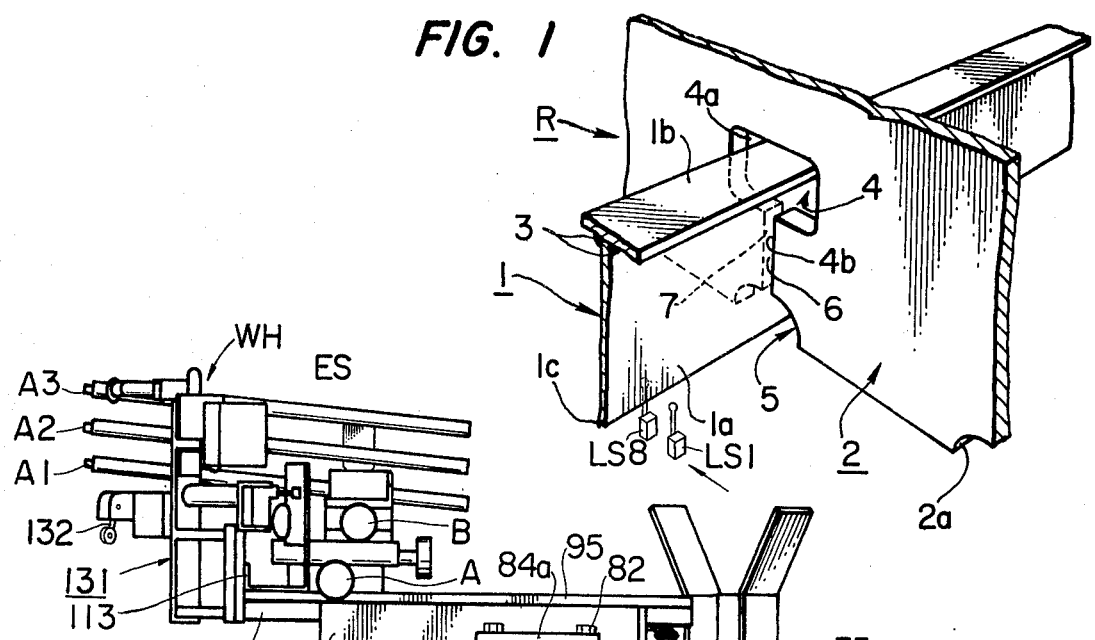
FIG. 1 is a perspective view of part of a longitudinal and a transverse structure member which are to be welded together by fillet welding a pair of vertically extending welding gaps formed between said two structural members, said gaps to be welded in two separate passes.

In FIG. 1, only a fragmentary portion of a latticework structure, generally denoted R, is shown in its perspective view. A rigid combination of a number of these structures R constitute in turn a stress-bearing part of the bottom of the hull of a modern large capacity, say 700,000-ton, oil-carrying, oceangoing tanker. This structure R comprises a number of longer longitudinal plate members, 1 and arranged parallel to each other, for example. The structure R further comprises a parallel arrangement of a number of shorter transverse plate members 2.

The member 1 has a T-shaped cross-section which consists of a vertical web 1a and an upper horizontal flange 1b rigidly and preparatorily welded together at 3. To receive each of these members 1, the transverse plates 2 are formed with a closed opening 4 which consists of an enlarged, substantially rectangular top opening portion 4a for passage of flange 1b with ample clearance and a depending narrow slot 4b flanking web 1a with opposed narrow welding gaps 6 and 7, the slot communicating at its top and bottom ends with said top opening part 4a and a lower "scallop" opening 5. This scallop facilitates a later welding procedure for welding at the bottom edge 1c of the longitudinal to a horizontal base plate, not shown. The transverse 2 is also welded to the same base plate in a later welding procedure.

It is welding along slots 6 and 7, for example, that the automatic welder, according to this invention, is effective for welding in two stages, although its usage is not limited only thereto along the length of slots 6 or 7 which extends from 30–200 cm.

Figure 2:
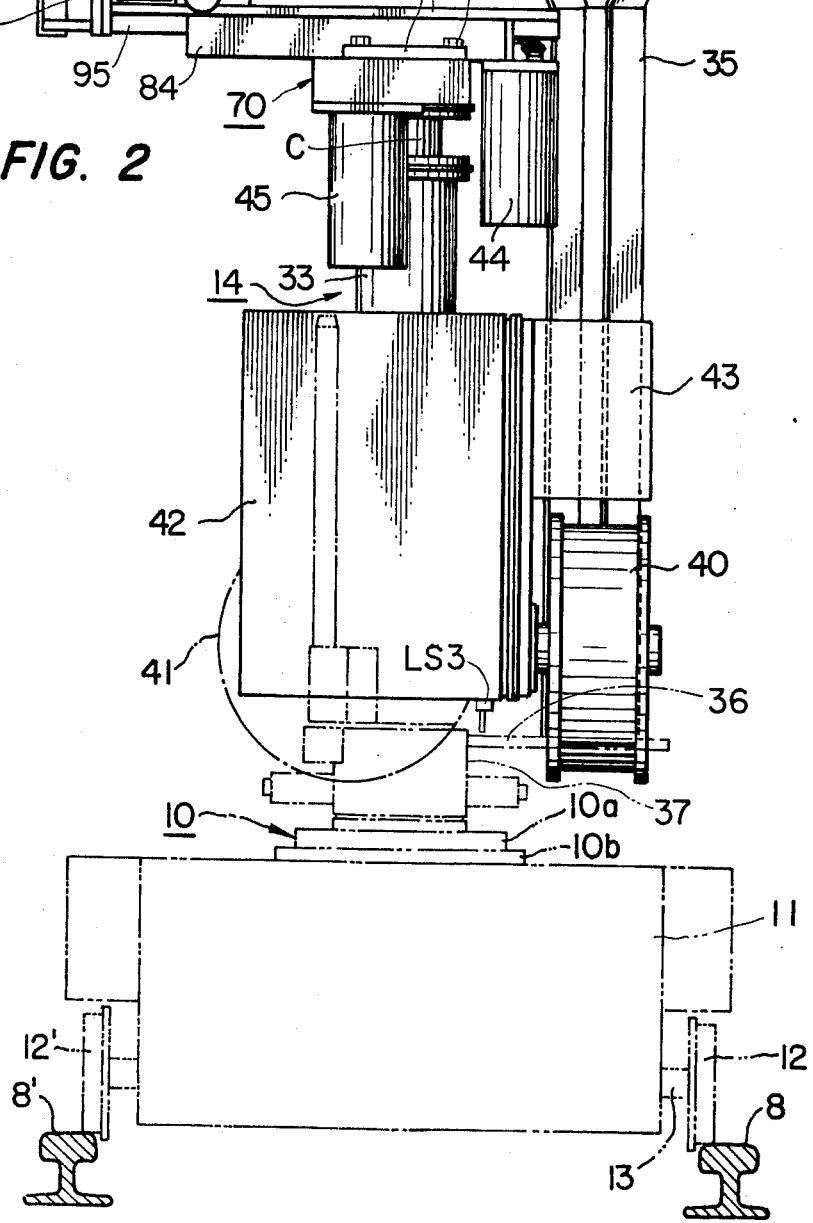
FIG. 2 is an end elevation of preferred embodiment of the automatic welder according to this invention, said welder being shown in a substantially enlarged scale as compared with FIG. 1 and its lower parts being illustrated in phantom line.
Figure 19:
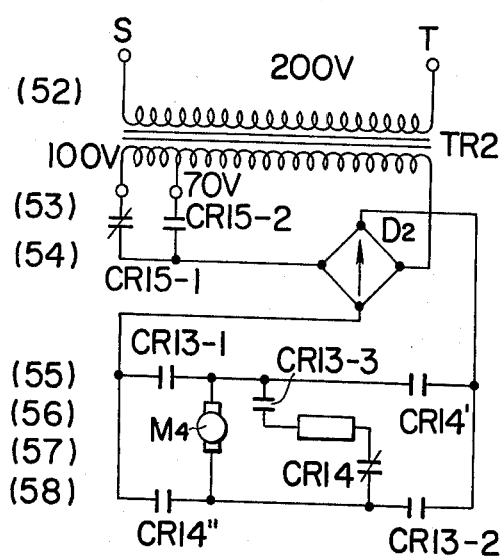
Figure 21:
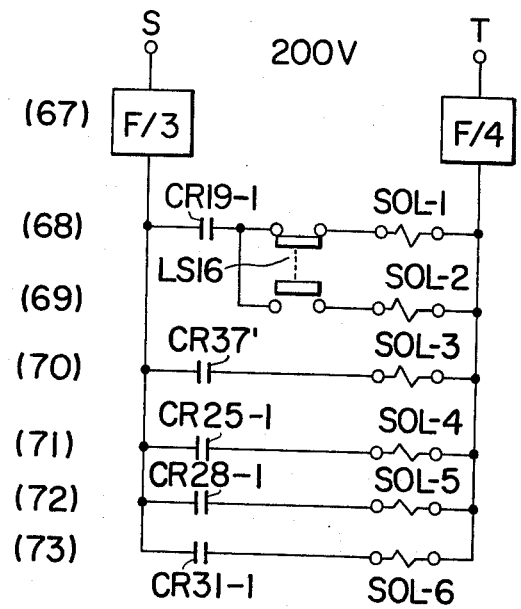

In FIG. 2, a preferred embodiment of the automatic welder is shown in schematic end elevation. In this figure, a hollow box type carriage 11 has two pairs of wheels 12, 12', only a pair being shown mounted on rails 8 and 8', respectively. Within the interior of the carriage 11, there is provided a first reversible drive motor M4, FIG. 19, for driving an axle 13 of the wheels 12 and 12'; a hydraulic pump 52, FIG. 6, a second drive motor 53 or M1, for driving the pump and an oil reservoir 50, FIG. 6, connected hydraulically with the pump, not shown specifically in FIG. 2.

Figure 3:
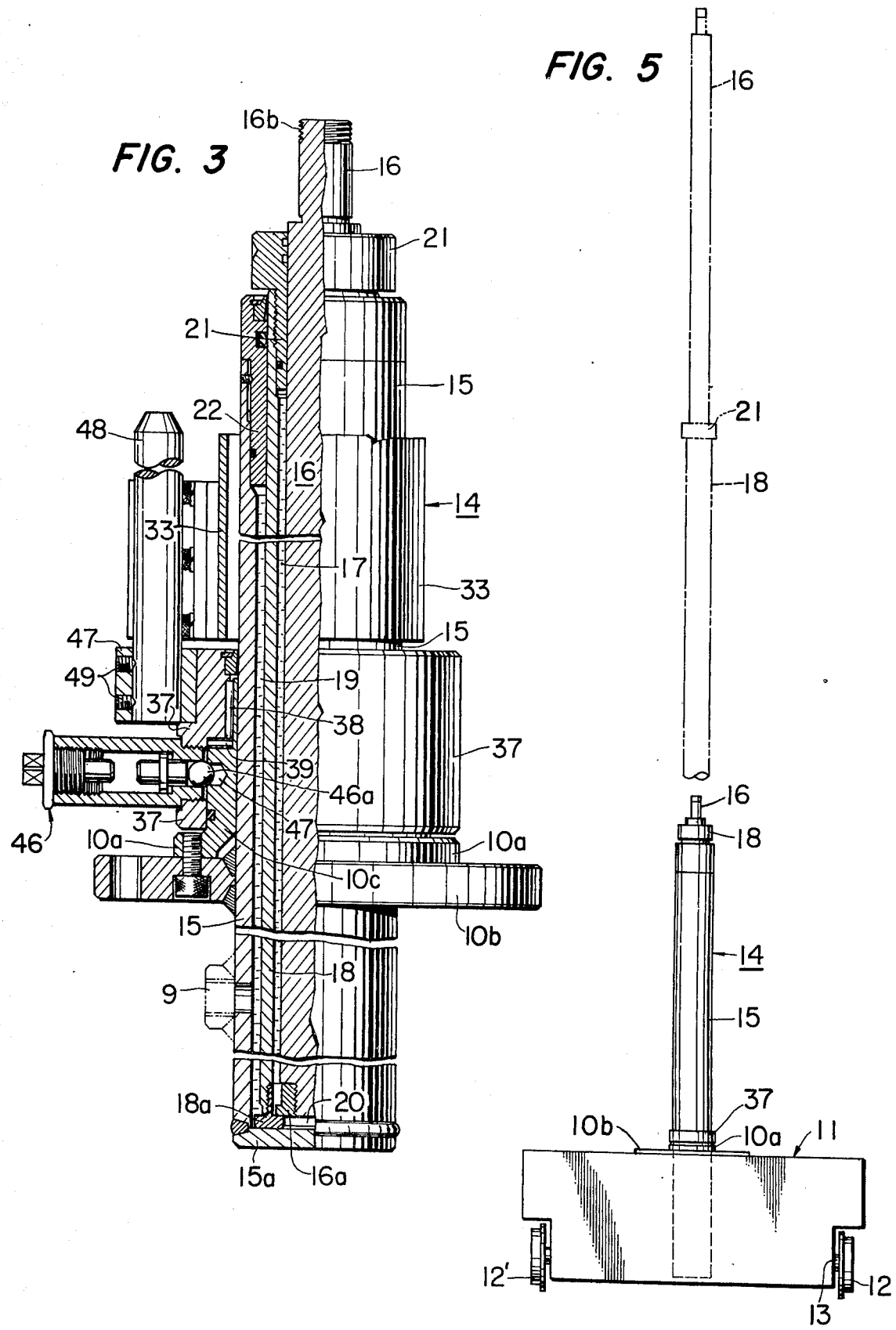
FIG. 3 is an enlarged, partially sectioned elevation of an extendable and retractable telescopic support for unit said automatic welder.

On the carriage 11, a two stage telescopically extendable and retractable piston-cylinder unit 14 is mounted, the detailed structure thereof being shown in FIG. 3.

Figure 6:
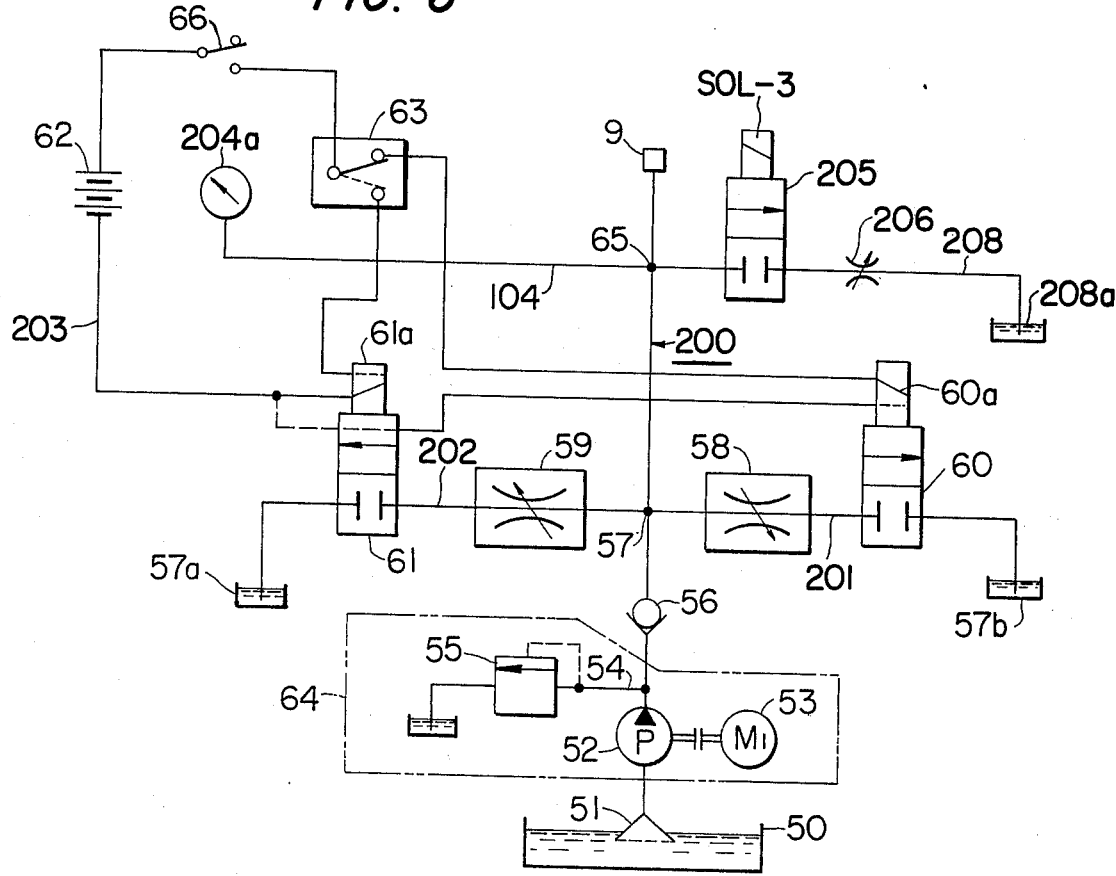
FIG. 6 is a combined electric and hydraulic circuit for operating the telescopic unit during the extending and retracting directions.

The unit 14 comprises an outer cylinder 15 which extends vertically into the carriage and is rigidly mounted through a base 10 on the upper surface of carriage 11. At 16 is an inner solid ram slidable in an outer hollow ram 18 which normally rests on the bottom end 15a of outer cylinder 15, as shown. An inner hydraulic chamber 17 is formed between rams 16 and 18 and an outer hydraulic chamber 19 between outer cylinder 15 and outer ram 18. A hydraulic piping 200 extends from the hydraulic pump shown at 52 in FIG. 6, to an inlet socket 9 integral with cylinder 15, as shown in FIG. 6. The upper end of the inner chamber 17 is closed by a plug 21 threaded into the upper end of hollow ram 18 and arranged to sealingly guide the rigid ram 16. In the similar manner, the upper end of the outer chamber 19 is closed by a plug 22 threaded into the upper end of the outer cylinder 15.

When the pump 52 is operated and oil pressure is supplied from the pump through said piping 200 to the inlet socket 9, both rams 16 and 18 will jointly ascend vertically. In this case, oil will flow from the inlet socket 9 into the outer chamber 19, thence into the fine gap formed between the inside wall surface of the closed cylinder bottom 15a and a stop piece 18a threaded in the bottom of outer ram 18, the inner ram 16 resting on the piece 18a through a stop piece 16a threaded on the inner ram 16. The common and simultaneous movement of both rams 16 and 18 is caused by such reason that the vertical load applied to the outer ram 18 is substantially smaller than that which is applied to the inner ram 16.

During the common ascending movement of the both rams, when the first stop 18a attached on the bottom end of outer ram 18 strikes against plug 22, the ram 18 is prevented from further vertical movement then the second stroke stage of the unit 14 begins, by continued movement of the rigid inner ram 16; until the second stop 16a on the inner ram 16 strikes against the lowermost end of the second plug 21; the second stroke terminates and the inner ram 16 is positioned at its upper most and fully extended position shown in FIG. 5 by phantom lines.

At 35 is a pillar unit, FIG. 2, the lower end of which being rigidly mounted on the free end of a horizontal arm 36 in turn rigidly attached to a rotatable cylinder 37, FIGS. 2 and 3. As will be described more fully hereinafter, the pillar unit 35 serves as a guide for supporting and guiding the, welding control electrical cord and protecting gaseous $CO_2$ supply hose while keeping them in their somewhat depending manner for compensation against excessive pull which may occasionally occur during the welding operation to be described. The cylinder 37 is rotatably mounted through a radial needle bearing 38, a thrust needle bearing 39 and a stationary sleeve 10c integral with a flange 10a bolted to a stationary base disc 10b, relative to the stationary outer hydraulic cylinder 15. The base 10 generally shown at 10 comprises the flange 10a and base disc 10b.

In FIG. 2, numerals 40 and 41 represent two of three reels adapted for delivery of welding wire electrodes, the reel 40 being shown in full line and the reel 41 being shown only by a chain-dotted line circle representing only schematically its outer configuration. These reels are mutually arranged at an angle of 120° and journaled on the main supporting box 42. There are three wire electrode feed motors and attached reduction gearings, not shown, which are arranged within the interior of the main supporting box 42, and three auxiliary boxes, of which only one is shown at 43. Each of these auxiliary boxes contains wire electrode guide rollers cooperating with one of said three reels as at 40 and 41. The main supporting box 42 and the auxiliary boxes, as at 43, are rigidly attached to a rotatable mantle cylinder 33 to be described. This mantle cylinder 33 is shown only partially in FIGS. 3, 8, 9 and 10.

Numeral 44 in FIGS. 2 and 13, and numeral 45 in FIGS. 2, 9, 10 and 14, represent a longitudinal and a lateral slide drive motor, respectively, and schematically illustrated only in their outline configuration. These drive motors 44 and 45 correspond to those denoted M3 and M2, respectively, in FIG. 20.

Cylinder member 37 is connected as by welding with a ring piece 47 which is shown at the left-hand side of FIG. 3, a long upright pin 48 being fixedly mounted in the ring core of said piece by means of a plurality of set screws 49. This upright pin 48 serves as a guide for the mantle cylinder 33 which is movable in the vertical direction up and down, as the case may be, as will be more fully described hereinafter.

In FIG. 6, numeral 50 represents an oil reservoir and when pump 52 is operated by an electric drive motor 53, oil is sucked from the reservoir through a strainer 51.

From a main hydraulic line 200 including the pump 52, a branch line 54 including an excess pressure relief valve 55 is branched off. Therefore, when the oil pressure prevailing in the main line 200 exceeds a predetermined value, such excess pressure is relieved as suggested by a dotted-chain line block 64, these constituents 52, 53, 54 and 55 represent in combination a pressure oil feed unit.

Figure 4:
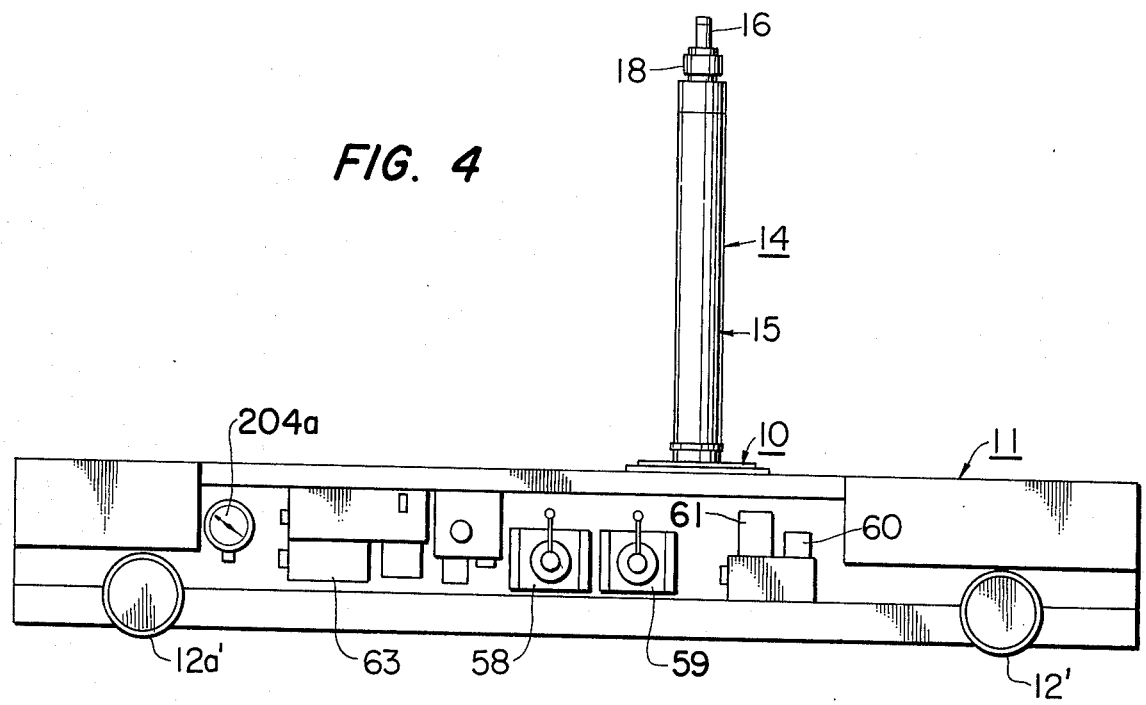
FIG. 4 is a reduced-scale elevational view of the wheeled carriage carrying thereon the telescopic unit.

At a downstream branch point 57 from a check valve 56 included in the main line 200, two branch lines 201 and 202 extend to auxiliary reservoirs 57b and 57a, respectively. Branch line 201 includes a flow regulator valve 58 and an electromagnetic valve 60 which has solenoid 60a. In the similar manner, branch line 202 includes a flow regulator valve 59 and an electromagnetic valve 61 which has solenoid 61a; these valves 58, 59, 60 and 61 are seen also in FIG. 4.

At a position downstream of said branch point 57 in the main line 200, there is a further branch point 65, from which a branch line 104 branches off and leads to a pressure gauge 204a. From the branch point 65, a further branch line 208 including a solenoid valve 205 and a flow regulator valve 206 extends to an auxiliary reservoir 208a.

An electric circuit 203 includes a source battery 62, a manual switch 66 and a change-over switch 63 is connected in parallel with said solenoid 60a and 61a, as shown.

Next, referring mainly to FIGS. 2, 3 and 6, the operation of the telescopic extendable and retractable unit 11 will be described.

Before extension of the telescopic unit manual switch 66 is open as shown, thereby no energizing current flows through solenoids 60a and 61a and thus the respective electromagnet valves 60 and 61 are kept in their closed position. This preparatory operation is carried out to prevent oil leakage from the main hydraulic circuit.

Under these conditions, a main power switch, not shown, is closed to operate the main drive motor 53 or M1. Thus, as aforementioned, pump 52 is actuated and pressure oil is delivered from the main hydraulic circuit through inlet 9 to the telescopic unit. Thus, the rams 16 and 18 are jointly driven hydraulically, as was described above.

In practice, however, when the stop 18a on the outer hollow ram 18 collides against the lowermost end of sealing plug 22, the upward stroke of the ram ceases and thus, the first stage of the telescopic extension stroke is terminated. When the height of the welding position to be described is within this first stage, the operator can initiate his welding procedure by means of the welding head WH to be described; in this case, the manual switch 66 is closed.

The inner ram 16 only is elevated hydraulically to initiate the second stage of upward telescopic movement and its bottom stop 16a abuts against the inner sealing plug 21 so as to terminate that stage. During this stage, the ram 16 can be stopped at any desired intermediate height and under this condition, the welding job can be initiated and continued, as will subsequently be described in detail.

At this stage, however, it will be described in detail how both rams 16 and 18 can descend in two stages substantially at a constant speed, and by reference substantially to FIG. 6 and thus assist to produce a uniform fillet weld.

As was referred to hereinbefore, when the welding procedure is initiated upon closure of the manual switch 66, current will flow from source battery 62 through switches 66 and 63 to solenoid 60a, electromagnetic valve 60 is thereby opened and pressure oil is branched off from main piping 200 at the branch 57 through flow regulator valve 58 which has been adjusted properly in consideration of a predetermined descend speed of the rams and further through the now opened electromagnetic valve 60 to auxiliary reservoir 57b which, when necessary, may constitute a part of the main reservoir 50. The oil pressure reduction will be transmitted through the inlet 9 to the telescopic assembly 14. Thus, the oil pressure prevailing in the inner hollow space of the outer ram 18 is subjected to corresponding reduction so as to maintain a predetermined higher pressure level such as 22–23 kg/cm$^2$ and the inner ram 16 will descend from its top or intermediate upper held position at a constant speed, until its bottom stop 16a strikes against stop 18a on the hollow ram. Thus, instead of only inner ram 16, descending both rams 16 and 18 will subsequently descend simultaneously as if they are rigid with each other. At the beginning of this simultaneous descend of both rams, the hydraulic pressure will be subjected to a sudden change which is sensed at the conventional sensing switch 63, thereby the switch 63 being transferred in its connection from its full line position to its dotted line one. Thus, current supply to solenoid 60a is interrupted, while the left-hand solenoid 61a is instead energized for closing the right-hand electromagnetic valve 60 and for opening the related electromagnetic valve 61. The regulator valve 59 has been opened to a larger opening degree, say twice, for example than that of the former regulator valve 58. This opening degree is adjusted, naturally upon consideration of the relative diameters of the both rams. Therefore, the oil flow rate now passing through these valves 59 and 61 is doubled the former rate passing through valves 58 and 60 successively.

In this way, the both rams 16 and 18 will descend in this second downward stage at the same speed to that of the first descend stroke in which the inner rigid ram 16 only descended. Thus, the telescopic unit 14 will take the fully contracted position as shown in FIG. 3.

Figure 7:
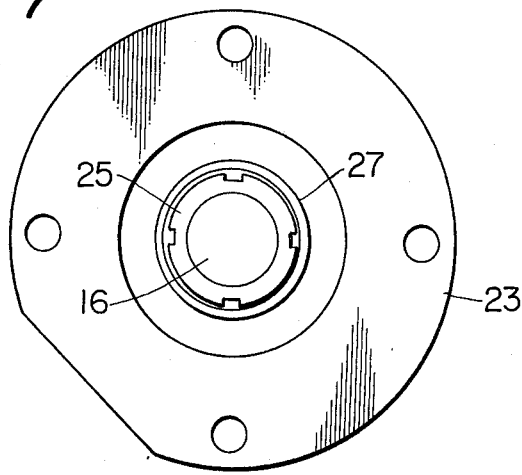
FIG. 7 is an enlarged top plan view of a double flange member journaled on top of the telescopic unit.
Figure 8:
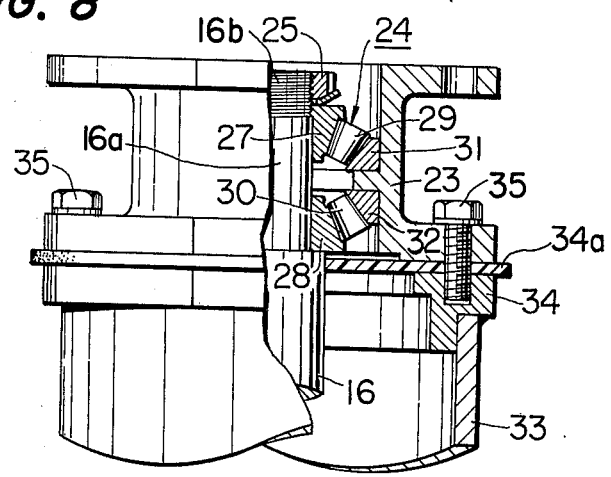
FIG. 8 is a partially sectioned side elevation of a rotatable unit mounted on top of the telescopic unit and including said double flange member of FIG. 7.

Referring next to FIGS. 7 and 8, a double flange member 23 is journaled on the top reduced portion 16a of said inner ram 16 by means of a double row roller bearing unit 24 having inner races 27 and 28, rollers 29 and 30 and outer races 31 and 32. This bearing unit 24 is kept in position as shown, by means of a female-threaded cap 25 engaged on the male-threaded part of the reduced end portion 16b of the top reduced portion 16a of the inner ram.

The mantle cylinder 33, only shown partially, is welded at its top to an intermediate flange piece 34 which is bolted as at 35 from below through a protecting insulator sheet 34a to the bottom of the member 23.

Figure 10:
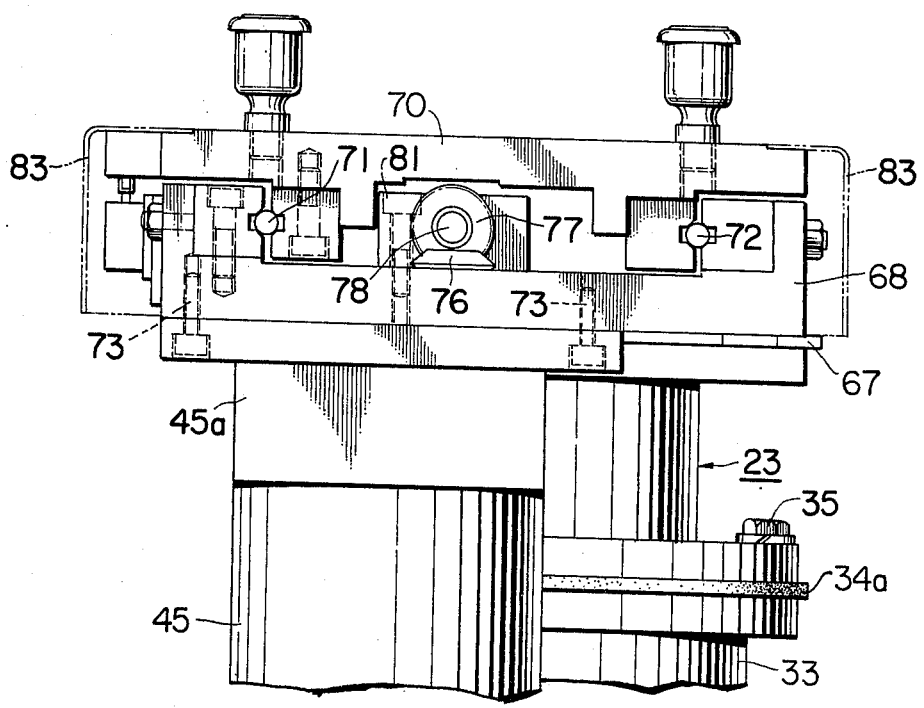
FIG. 10 is an end view of FIG. 9.
Figure 9:
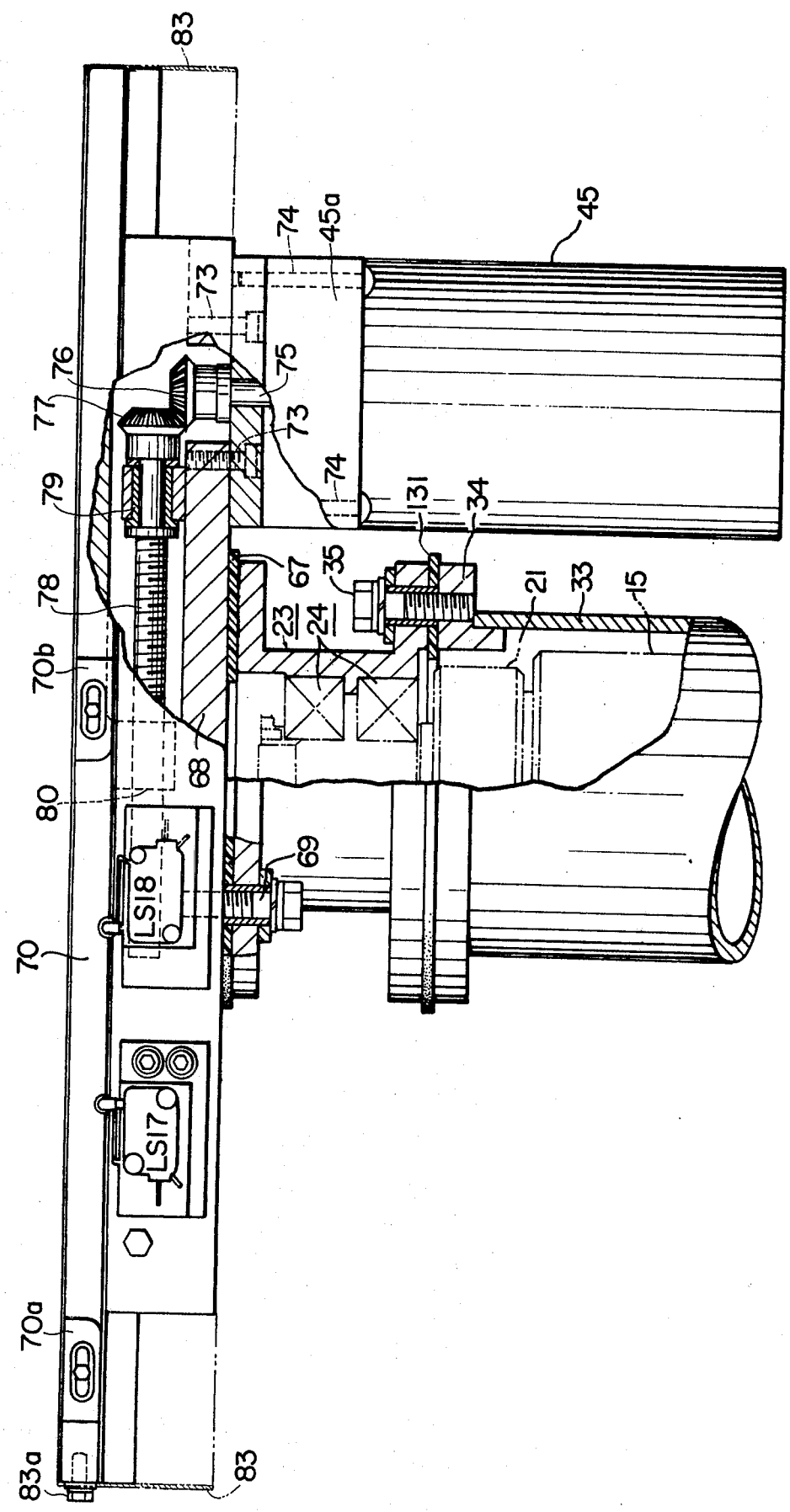
FIG. 9 is an enlarged partially sectioned elevation of a lateral slide unit fixedly mounted on the rotatable unit shown in FIG. 8.

Referring further to FIGS. 9 and 10, a horizontally arranged first or lateral slide guide 68 is bolted rigidly as at 69 through a protecting insulator 67 onto the double flange member or rotatable table 23.

On the slide guide 68, a lateral slide 70 is slidably mounted on suitable bearings 71 and 72 for movement in the horizontal direction, FIG. 9, and in the perpendicular direction relative to the plane shown in FIG. 10.

Drive motor 45 for slide 70 is shown more specifically in FIGS. 9 and 10, only in outline; motor 45 is rigidly attached at 73; in FIGS. 9 and 10, to the slide guide in a suspended manner, as shown. The drive motor is provided with a reduction gearing, shown only in outline at 45a, which is rigidly bolted at 74; FIG. 9 this reduction gearing 45a, however, has been omitted from FIG. 2 and bolts 74 have been omitted from FIG. 10 for the same purpose.

The reduction gearing 45a has an output shaft 75 which carries at its top a bevel pinion 76 meshing with a mating gear pinion 77; the latter is rigidly mounted on the right-hand end of a lateral slide feed shaft 78, FIG. 9, arranged on a horizontal plane. This feed shaft, has male threads substantially along its length and, is rotatably mounted at one end in a bearing 79, and passes through an intermediate female-threaded guide 80. The bearing 79 is rigidly mounted as at 81 in FIG. 10 on lateral slide guide 68, while the guide 80 depends rigidly from lateral slide 70. Thus, this slide 70 can slide on its slide guide 68 leftwards or rightwards in FIG. 9, depending upon the rotational direction of the shaft 78.

The slide 70 is fitted rigidly with a cover 83, having the shape of an inverted tray shown schematically in chain-dotted linen in FIGS. 9 and 10, but in full line in FIG. 2, by means of a plurality of fixing bolts 83a of which only one is shown in FIG. 9.

In FIGS. 11–13, numeral 84 represents a longitudinal slide guide having a pair of rigid and integral side flanges 84a and which are attached to lateral slide 70 by fixing bolts 82 (FIGS. 9 and 10).

Numeral 44 represents a longitudinal slide drive motor fitted rigidly with a reduction gear box 44a, both being shown substantially in its outline; this motor assembly is rigidly suspended from a supporting bracket 85, the attaching bolts being, however, are omitted from the drawing since the arrangement is similar to that employed in the drive motor 45. The bracket 85 is fixedly attached to the slide guide 84 by means of a plurality of horizontally arranged fixing bolts, not shown.

An output shaft 86 extends upwards from inside of the reduction gear box 44a, a bevel pinion 87 is fixedly attached to top end of the shaft 86 and meshes with a bevel gear 88 fixed to the right-hand end of a horizontally arranged drive shaft 89, FIG. 13, journaled in a bearing 90. This shaft 89 has male threads substantially along its entier length, as most clearly be seen in FIG. 11.

A follower 94, FIG. 11, has a substantially channel shape and is formed with a female-threaded guide portion 91 and a blank-bored guide portion 93, the former portion meshing with the threaded part of said drive shaft 89 and the latter portion being in mutually slidable relationship with the blank part of the same drive shaft. Thus, the follower 94 moves to-and-fro along the drive shaft, depending upon the rotational direction of the latter. The longitudinal slide 95 is slidable in its axial direction on the slide guide 84. For this purpose, a pair of bearings 130 and 131 are provided therebetween as shown in FIG. 12.

A second follower 97 is fixedly attached to the longitudinal slide 95 by means of bolts 96 for moving unitarily with the said slide in the horizontal direction in FIG. 11. This follower 97 is formed with a projecting guide portion 92 having a plain non-threaded opening 92a through which the shaft 89 extends, as in the similar way as at 93. A coil spring 98 is provided between the guide portions 91 and 92 under compression, so as to minimize clearances therebetween. Thus, the first and second followers 94 and 97 normally cooperate with each other so as to perform a unitary movement in the horizontal direction when seen in FIG. 11. Under normal operating conditions wherein no thrust force is transmitted reversedly from the side of the welding torches A1, A2 and A3, FIG. 1, to be described and from left to right in FIG. 2 or 11, the longitudinal slide 95 can be subjected to its positional adjustment depending upon the rotational direction and amount of drive shaft 89.

Figure 14:
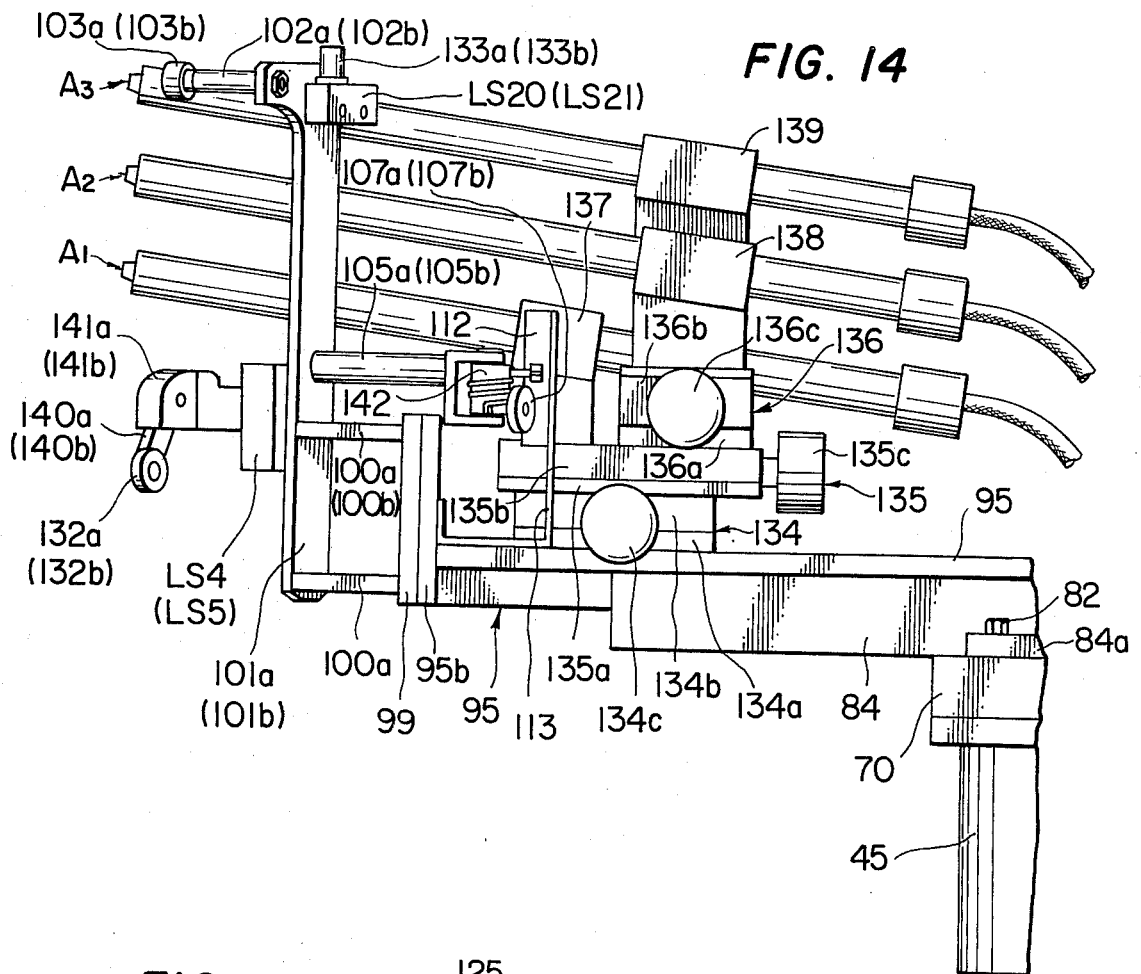
FIG. 14 is an enlarged elevation of the welding head shown in FIG. 2, wherein, however, an electric and mechanical sensing safety device ES shown therein and staying outside of the scope of the present invention has been omitted from the drawing only for simplicity.

In FIG. 14, the welding head WH is shown in an enlarged side elevational view as compared with FIG. 2.

On the forward end of longitudinal slide 95, a lateral adjusting mechanism 134 is mounted which comprises a small base 134a, a small lateral slide 134b slidably mounted thereon and an adjusting screw 134c. By manipulating this adjustment screw 134c, all the three torches A1, A2 and A3 can be finely adjusted as a whole in their lateral position perpendicular to the plane of FIG. 14.

On the small lateral slide 134b, a longitudinal adjustment mechanism 135 is mounted which comprises a small base 135a, a small longitudinal slide 135b slidably mounted thereon and a longitudinal adjusting screw 135c. By manipulating this adjusting screw 135c, the three torches can be adjusted finely and as a whole in their longitudinal position perpendicular to said lateral direction.

A third adjusting mechanism 136 is mounted on the small longitudinal slide 135b, said mechanism comprising a small base 136a, a small lateral slide 136b slidably mounted thereon with an adjusting screw 136c; by manipulating the screw 136c, the middle torch A2 can be separately and finely adjusted relative to the lowest torch A1.

A fourth adjusting mechanism, not shown, is provided on the slide 135b at the same height as the third adjusting mechanism and at a hidden position in FIG. 14. By manipulating a similar adjusting screw as that denoted 136c, the highest torch A3 can be finely and laterally adjusted in its position and independently and relative to the lowest torch A1.

A first clamp 137 is fixedly mounted on the small longitudinal slide 135b for clamping the lowest torch A1; a second clamp 138 is fixedly mounted on the small lateral slide 136b for clamping the middle torch A2; and a third clamp 139 is fixedly mounted on a further small lateral slide, not shown, which is provided in opposition to the said slide 136b, for clamping the highest torch A3.

In FIGS. 14 and 15, the slide 95 is formed with a flange 95b to which a plate member 99 is rigidly attached. Two rigid supporting arms 100a and 100b extend parallel to each other forwards from one surface of the plate member 99 and are provided with respective rigid support bars 101a and 101b each representing an included angle of 45° and extending vertically relative to the plane of FIG. 15. At the upper ends of these support bars 101a, 101b are support arms 102a and 102b, respectively, carrying at respective free ends, feeler rollers 103a and 103b adapted to contact the related wall surfaces of the longitudinal member 1 and traverse member 2 for proper positioning of the welding head WH.

Additional feeler rollers 107a and 107b are normally in rolling contact with the longitudinal 1 and the transverse member 2, respectively, said rollers being freely rotatably mounted on respective shafts 108a and 108b pivotably mounted at 109a and 109b, respectively, on respective angle pieces 106a and 106b, as shown in FIG. 15. These angle pieces are fixedly attached at their inner ends to the respective support bars 101a and 101b.

The roller shafts 108a and 108b are fixedly attached fixedly at their inner ends at an angle of 45° to transmission bars 110a and 110b, respectively, which are pivotally linked at 111a and 111b, respectively, with operating bars 116a and 116b, (FIGS. 15–17), having length adjusting nuts 117a and 117b, respectively. These operating bars extend from opposite ends into a differential gearing and switch bracket 113 which is fixedly mounted in turn on the longitudinal slide 95 through a bracket 113. Rollers 107a and 107b are spring urged towards the longitudinal and the transverse members by springs 142 being shown only one schematically in FIG. 14.

Figure 16:
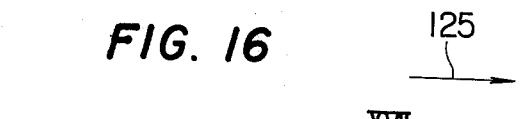
FIG. 16 is an enlarged front elevational view of a differential gearing and electric switching type welding head positioner unit shown in FIG. 15, wherein a cover member has been removed for clearer representation.
Figure 17:
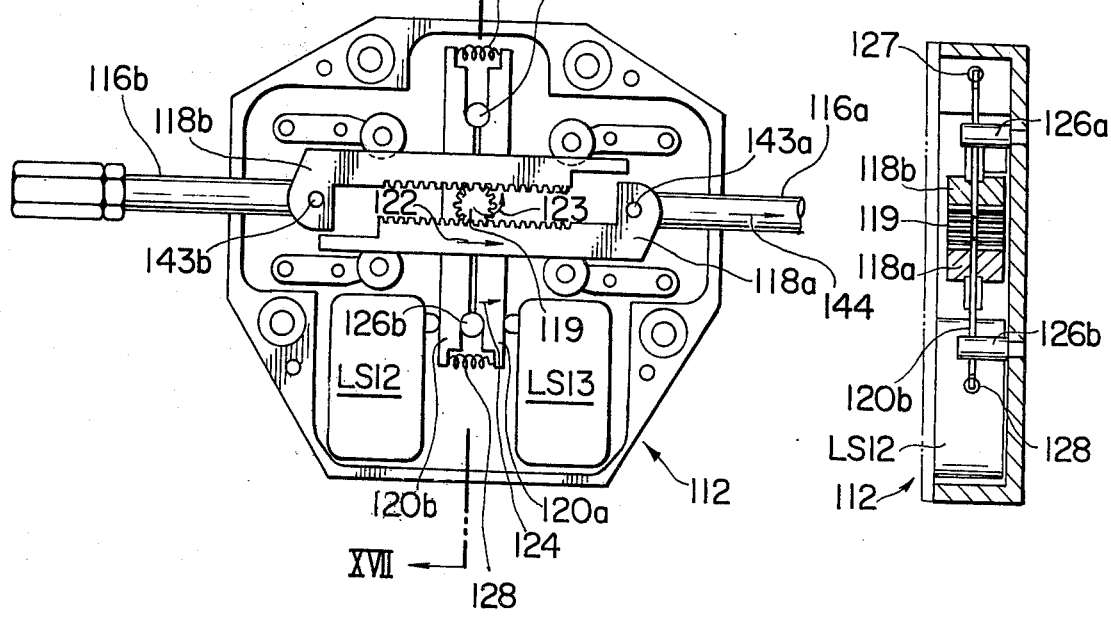
FIG. 17 is a cross section of the positioner taken along a section line XVII — XVII shown in FIG. 16, wherein the cover member is shown in phantom line.

The differential gearing and switch box 112 is shown more specifically in FIGS. 16–17.

Operating bars 116a and 116b are pivotably connected at their inner ends by respective pivot pins 143a and 143b with outer ends of differential gear racks 118a and 118b, a pinion 119 being kept in meshing therewith. A pair of pressure plates 120a and 120b squeeze the pinion 119 its uninterrupted central portion and under pressure by a pair of tension springs 127 and 128 and through intermediate spacing pins 126a and 126b.

Limit switchs LS12 and LS13 are provided within the interior space of said box 112 for being controlled by the movement of the pressure plates 120a and 120b.

When feeler rollers 107a and 107b are kept in pressure contact with the longitudinal and the transverse member as shown in FIG. 14, the pinion 119 is at its neutral and central position shown in FIG. 16, wherein microswitches LS12 and LS13 are off.

If, however, one of these feeler rollers, say 107a, is provisionally out of contact with the inside wall surface of the longitudinal member 1, on account of configurational irregularities as shown in phantom at 113 in FIG. 15, in this case, feeler roller unit 107a–108a and transmission bar 110a pivot clockwise in FIG. 15 as shown by respective arrows 114 and 115 so that the operating bar 116a is pulled outwards as shown by an arrow 114 (FIG. 16) and its related lower rack 118a is caused to move in the same direction as shown by a further arrow 122, thereby the pinion 119 is rotated counter clockwise as shown by an attached arrow 123 and shifting rightwards in FIG. 16 by a half distance. Right-hand side pressure plate 120a will be moved correspondingly as shown by an arrow 124, thereby switch LS13 being closed, so as to move the lateral slide 70 and thus the welding head WH in the same as that of the bar 116a as shown by an arrow 117, FIG. 15, by energizing the drive motor M3, as will be more fully described with reference to FIGS. 18 and 20.

If the other feeler roller 107b becomes off from contact with transverse member 2, similar motion will occur as above, so as to close switch LS12. In this case, the lateral slide and the welding head are caused to move in the opposite direction to the arrow 117.

If the former feeler roller 107a is pressurized, it will be seen from the foregoing that the switch LS12 is closed, while when the latter feeler roller 107b is pressurized the switch LS13 is closed.

Further, referring to FIGS. 18–22, the electric control circuit is illustrated, together with its operation. This control circuit is arranged on a control panel, not shown, mounted on the carriage 11, also not shown.

When a manual main switch SW1 at address 1 is closed, current is supplied from a current source, 200 volts, not shown, through a transformer TR1 having terminals S and T connected to said current source, thereby all the electric circuits shown in FIGS. 18–21 being energized with 100 voltcurrent.

For initiation of the automatic operation, starting push button PB 6 at address 2 is depressed, relay coil CRA is energized so that its relay contact CRA-1 is closed for holding purpose. At the same time, relay contact CRA-2 at address 3 is also closed.

When the welding head WH is positioned at its lowermost and off-service position shown in FIG. 2, limit switch LS3 is kept in its closed position so that relay coil CR7 at address 50 is energized, so as to close its relay contact CR7-1 at address 3, thereby relay coil CR13 being energized. Thus, relay contacts CR13-1 at 55 and CR13-2 at 58 are closed, while relay contact CR13-3 at 56 is opened, thereby carriage drive motor M4 being energized for initiating the running of the carriage 11. This motor M4 is mounted on the carriage for driving either wheel pair 12; 12' or 12a; 12a', although not shown.

When the carriage 11 arrives at the welding position shown in FIG. 1, two limit switches LS8 and LS1 mounted on the carriage 11, not specifically shown, are successively brought into contact with the lower most edge 1c of longitudinal member 1. Thus, limit switch LS8 at 4 is closed and relay coil CR15 is energized, thereby relay contact CR15-1 at 53 being opened and that denoted CR15-2 being closed so as to make switching the secondary side of transformer TR2 at 52 from 100 volts to 70 volts for slow-down of the carriage running speed before stoppage.

By closure of limit switch LS1 at 5, relay coil CR5 is energized, so as to close relay contact CR5-1 at 6 for energization of relay coil CR17. With the energization of relay coil CR17 at 6, relay contact CR17-1 at 3 is opened, so as to de-energize the drive motor circuit at M4. At the same time, further relay contact CR5-2 at 7 is closed. By the de-energization of relay coil CR13 at 3, relay contact CR13-3 at 7 is closed and relay coil CR18 at 7 and delay timer relay T4 at 8 are energized. Therefore, the carriage 11 is brought into dead stop.

With the energization of relay coil CR18 at 7, relay contact CR18-1 at 21 is closed. Since contact T5-2 at 20 is closed, relay coil CR38 is energized so as to keep relay contact CR38-1 in its closed position. Therefore, current will pass through magnetic coil MS1 is energized, thereby oil pump drive motor shown M1 in FIG. 6 being brought into operation, so as to expand the telescopic unit 14 for elevating the welding head WH.

Figure 20:
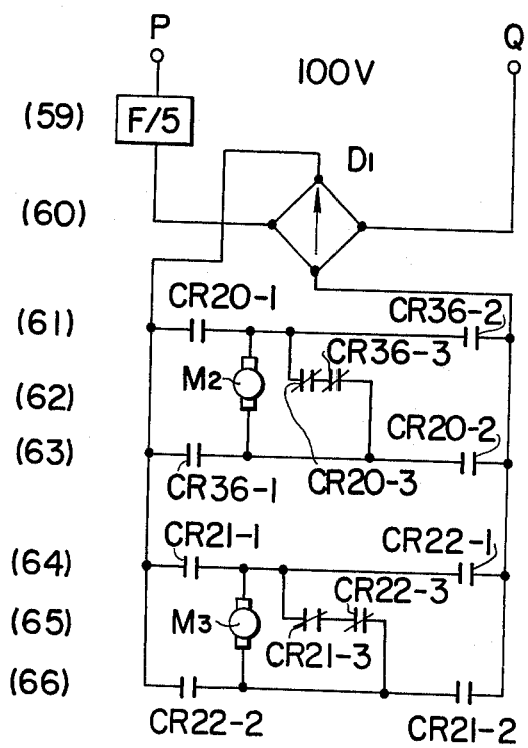

After lapse of a predetermined time period such as 15 seconds from initiation of timer operation at T4 at address 8, contact T4-1 at 9 is closed, relay coil CR20 is energized, motor 44 which corresponds to M2 in FIG. 20 is brought into operation for advancing the head WH.

The advancing movement of the head WH is mechanically and forcibly terminated when the feeler rollers 103a and 103b, FIGS. 14–15 are brought into pressure contact with the inside surfaces of longitudinal member 1 and transverse member 2, respectively. Therefore, the simultaneous advancing movement of longitudinal slide 95 is caused to terminate. Second follower 97 is also caused to stop. With continued rotation of drive shaft 89, the gap distance 1 shown in FIG. 11 will become larger and larger, thereby the second follower 97 receding forcibly in the right-hand direction when seen in FIG. 11, until finally its rear end portion 97a is brought into contact with the actuator button of limit switch LS10 which is thus caused close; this switch LS10 is shown in FIG. 11 and at 12 of FIG. 18.

By the closure of switch LS10, relay coil CR12 is energized, so as to open relay contact CR12-1 at 9 for deenergization of relay coil CR20. Thus, its relay contacts CR20-1 and CR20-2 at 61 and 63 are caused to open for de-energizing the motor operation at M2, FIG. 20, corresponding to that shown at 44 in FIG. 12.

During this operation, the coil spring 98 is kept at its compressed state for keeping the welding head WH at a proper pressure contact with the workpieces through the feeler rollers 103a and 103b.

When the head contact pressure should become larger than the prescribed value and thus the said gap distance 1, FIG. 11, becomes larger, the forward enlarged end portion 97b of second follower 97 will recede from contact with the operating push button of limit switch LS11 which is visible in FIG. 11 and in FIG. 18 at 10, is closed from its normally open state, thereby energizing a relay coil CR36 shown 11 of FIG. 18. By the energization of this relay coil CR36, relay contact CR36-1 and CR36-2 are closed at 63 and 61, respectively, while further relay contact CR36-3 at 62 is opened, so as to reverse the rotation of the motor M2. In this way, the head contact pressure can be maintained always within reasonable limits.

Limit switches LS12 and LS13 are provided at 13 and 14, respectively. When either of these limit switches is actuated, relay coil CR21 or 22 is energized for rotation of the motor M3 which corresponds to that shown at 45 in FIG. 9, in one or other direction by "on" or "off" control of related contact group CR21-1; CR21-2 and CR21-3 or CR22-1; CR22-2 and CR22-2, shown at 64–66, respectively, as in the similar manner described hereinbefore in connection with the motor M2. By this control operation for proper movement of lateral slide 70, proper angular positioning of the welding head WH is established.

Limit switches 17 and 18 appearing at 13 and 14, respectively, are mounted at a proper mutual distance on the lateral slide 68 and normally held on. Actuating projections 70a and 70b are mounted on the lateral slide 70 and at a mutual distance longer than the switching distance between the switches 17 and 18. If the slide 70 should advance an excess distance, actuating projection 70b acts upon the switch LS18, so as to prevent its further advancement. An excess backward movement is prevented by contact of actuating projection 70a with switch LS17.

Excess movements of the longitudinal slide 95 are prevented by similar actuation of limit switches LS6 and LS7 which are mounted on the longitudinal guide 84, as shown in FIG. 13.

Limit switch LS19 is supported on longitudinal guide 84 through an insulating support 84c as shown in FIG. 12 in full line and in FIG. 11 in dotted line. This limit switch LS19 senses the advancement of longitudinal slide 95 which carries the welding head WH as was referred to in the foregoing.

With advancing movement of the slide 95, a projecting portion 95e formed thereon acts upon limit switch LS15 which is thus closed.

By the closure of this switch LS19 appearing at address 15, current flows through the switch, the already closed relay contact CR12' and relay coil CR9, thereby its relay contact CR9' at address 23 being closed.

When the longitudinal slide is brought into its pressurized position as was referred to, limit switches LS4 and LS5 positioned at 22 and 23, respectively, under the action of the sensing roller lever 132, are brought to their off position and relay coil CR8 is in its off-position waiting for an energizing signal to be described.

When sensing member 133a or 133b of the upper stroke end sensor 133, FIGS. 14 and 15, strikes against the lower surface of the flange 1b of longitudinal plate 1 during the upward movement of the head WH, either of limit switches LS20 or LS21 at 16 or 17 is "closed" and thus, relay CR11 is energized, so as to close its relay contact CR11' at 18 for initiation of the counting operation of timer T5. These sensing members 133a and 133b and the related limit switches LS20 and LS21 are mounted on respective support arms 101a and 101b, as seen from FIGS. 14 and 15.

When the timer or delay relay T5 has terminated its counting period such as, preferably 1 second, its contact T5-1 at 19 is closed, so as to energize relay CR22A. At the same time, normally closed contact T5-2 at 20 is opened, while relay contacts CR22A-1 at 23; CR22A-2 at 27, CR22A-3 at 31 and CR22A-4 at 28 are closed. By the interruption of relay contact T5-2, relay coil CR38 at 20 is de-energized, so as to open its contact CR38-1 at 21 for de-energization of magnetic coil MS1 at 21, thereby the motor M1, FIG. 6, being de-energized through the opening of its relay switch, not shown. By the de-energization of this motor M1, the upward movement of the head WH is terminated by stopping oil feed from oil pump 52 to the unit 14.

By closure of relay contact CR22A-2 at 27, relay coil CR19 is energized, relay contact CR19-1 at 68 is closed and CR19-2 at 21 is opened, either of solenoid-operated valve SOL-1 or SOL-2 which correspond to those denoted 60 or 61 in FIG. 6, is opened, so as to initiate lowering movement of the head WH. By the closure of relay contact CR22A-4 at 28, timer relays T6, T7 and T8 initiate their respective delay operation.

By the closure of relay contact CR22A-3 at 31, relay coil CR23 is energized, its relay contact CR23' at 32 is closed.

Figure 22A:
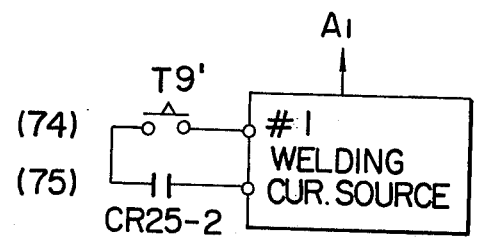
FIGS. 22A; 22B and 22C are three separate current sources adapted for feeding the three welding torches, respectively, under the control of the circuit shown jointly in FIGS. 18 – 21.
Figure 22B:
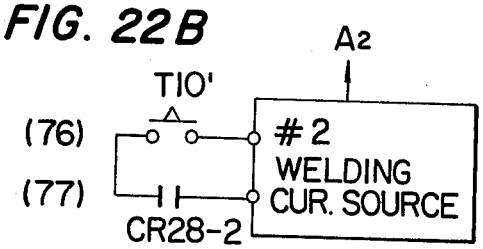
Figure 22C:
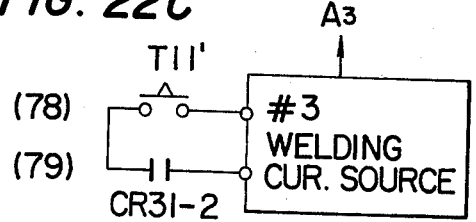

Upon lapse of a short time period thereafter, say 5 seconds, counted from the initiation of the head forward movement, relay contact T6' at 32 is closed and relay coil CR24 is energized, so as to close its contact CR24' at 34, thereby relay coil CR25 being energized. In this way, relay contact CR25-1 at 71 is closed, so as to energize solenoid coil SOL-4 of a gas supply valve for supply of protecting gas, $CO_2$, to the first lowermost welding torch A1 shown in FIG. 1. At the same time, relay contact CR25-2 at 75, FIG. 22, is closed. With energization of relay coil CR24 at 32, timer relay T9 is energized, so as to close its contact T9' at 74 for electric connection of No. 1 welding current source, schematically shown at FIG. 22A to the said first torch A1, thus the latter initiating its electrical welding job.

With energization of timer relays T7 and T8 positioned at 29 and 30, respectively, second and third welding torches A2 and A3 will initiate successively their respective welding procedures, say after 18 and 31 seconds counted from the said closure of relay contact CR22A-4 at 28. For this purpose, addresses 35–37 including relay contact T7', relay coil CR27, timer relay T10, relay contact CR27' and relay coil CR28 are provided for timer relay T7, in the similar way as the addresses 32–34 for the former timer relay T6. In the similar way, addresses 38–40 including relay contact T8', relay coil CR30, timer relay T11, relay contact CR30' and relay coil CR31 are provided for the timer relay T8. The addresses 72 and 73 are provided for welding torches A2 and A3, respectively, and include relay contacts CR28-1 and CR31-1 and solenoid gas feed valves SOL-5 and SOL-6, respectively, in the same manner as the address 71 for the first torch A1. In addition, addresses 76–77 including relay contact T10' and CR28-2 and those denoted 78–79 including relay contacts T11' and CR31-2 are provided for the second and third welding torches A2 and A3, respectively. Further operation of these welding torches A2 and A3 are similar to that of the first torch A1, and the No. 2 and No. 3 welding current sources are electrically connected with these respective torches A2 and A3, respectively.

Thus, it will be seen from the foregoing that all the welding torches A1, A2 and A3 continue now their welding procedures while the head WH performs its downward movement.

When either of the sensor rollers 132a; 132b disengages from contact with the transverse plate member 2 at rounded opening 5, roller supporting bar 140a or 140b swivels downwards and forward around its pivot 141a or 141b, FIG. 15, when seen in FIG. 14, and its attached microswitch LS4 or LS5 provided at 22 or 23 is closed, relay coil CR8 at 23 and timer relays T1–T3 provided at 24–26, respectively, operate. The necessary mechanical linkage between the bar 140a or 140b and the switch LS4 or LS5 is shown only schematically by respective dotted lines 141a or 141b in FIG. 14.

By the actuation of timer relay T1, its relay contact T1' at 41 is closed and relay coil CR26 is energized, so as to open its normally closed contact CR26-1 at 28 and to de-energize timer relay T6. By this de-energization, relay contact T6' at 32 is opened, so as to de-energize relay coil CR24 and timer relay T9. By this de-energization, relay contact CR24' at 34 is opened and relay coil CR25 is de-energized, so as to interrupt relay contact CR25-2 for disconnection of the first welding current source from the fist welding torch A1.

By the successive de-energization of timer relays T2 and T3, the second and third welding current sources are disconnected in the similar way from the second and third welding torches A2 and A3, respectively.

With closure of relay contact T1' at 41, relay coil CR26 is energized, so as to close its contact CR26-2 and CR26-3 provided at 42 and 51, respectively. In the similar way, with closure of relay contact T2' at 44 by the energization of relay coil T2, relay coil CR29 is energized, its relay contacts CR29-1 at 29, CR29-2 at 46 and CR29-3 at 51 are closed. With energization of relay coil T3, its relay contact T3' at 46 is closed, so as to energize relay coil CR32, thereby its relay contact CR32-1 at 30, CR32-2 at 48 and CR32-3 at 51 being closed.

By the successive closure of three series-connected relay contacts CR26-3; CR29-3 and CR32-3 at 51, relay coil CR34 is energized, so as to close CR34-1 at 11 and CR34-2 at 26 and to open its relay contact CR34-3 at 43.

With closure of relay contact CR34-1 at 11, relay coil CR36 is energized, the longitudinal slide 95 is caused to recede. By the closure of relay contact CR34-2 at 26, relay coil CR19 is maintained at its energized state. By the opening of CR34-3 at 43, relay coil CR34 is de-energized.

At the end of the return and backward movement of the longitudinal slide, projection 95c, FIG. 13, will operate upon limit switch LS7 at 48 which is caused thus to close, thereby relay coil CR10 being energized at its contact CR10' at 49 being caused to close. In this way, relay coil CR37 at 49 is energized and its contact CR37' at 70 is closed and valve solenoid SOL-3 is energized, so as to open the valve 105 for rapid downward movement of the head WH.

At the end of this downward rapid movement of the head, limit switch LS3 is brought into contact with the upper surface of disc 10b, FIGS. 3 and 5, thereby the switch shown also at 50 being closed for energization of relay coil CR7 and for display of the complete return of the head.

By the energization of this relay coil CR7, its relay contact CR7-1 at 3 is closed, thereby the carriage 11 being again caused to run and so on.

With the torches A1, A2 and A3, the welding operation progresses from upper to lower along the welding gap 6 or 6 in a three pass-two layer mode by the successive formation of beads B1, B2 and B3 with respective torches A1, A2 and A3, respectively. The bead formation is schematically illustrated at the lower right corner of FIG. 15.

The embodiments of the invention in which an exclusive property or privilege is claimed are as follows:

1. Apparatus for automatic and vertical fillet welding, comprising combination
   a. a vehicular carriage;
   b. a telescopically extendable and retractable support unit operatively connected to said carriage;
   c. a lateral slide unit comprising a first slide guide operatively connected to said support unit and a lateral slide slidably mounted on said first slide guide;
   d. a longitudinal slide unit operatively connected to said lateral slide and comprising a second slide guide and a longitudinal slide mounted on said second slide guide;
   e. a welding head operatively connected to the end of said longitudinal slide and comprising a plurality of welding torches vertically spaced relative to one another;
   f. a rotatable table operatively connected to the top of said telescopic support unit and to said first slide guide of said lateral slide unit; and
   g. a hydraulic pump circuit on said carriage including means for circulating fluid to said telescopic support unit, said circuit having control means for controlling fluid flow from the latter, so as to retract the telescopic support unit substantially at a constant speed while the welding bead is effecting a welding procedure.

2. The apparatus of claim 1 wherein said hydraulic pump circuit includes a plurality of electromagnetic valves; said support unit having a number of stages, said valves corresponding to the number of stages of said telescopic support unit, means for closing said valves simultaneously in relation to the number of stages of said telescopic support unit and during a retraction stroke thereof.

3. The apparatus of claim 1 wherein said rotatable table comprises a double flange member.

4. The apparatus of claim 1, further comprising bearing means between the first slide guide and the lateral slide.

5. The apparatus of claim 4, further comprising a first electric drive motor operatively connected on said first slide guide and including gearing and threaded shafting for driving said lateral slide.

6. The apparatus of claim 1, further comprising bearing means between said second slide guide and said longitudinal slide for slidingly guiding the latter relative to said second slide guide.

7. The apparatus of claim 6, further comprising a drive electric motor mounted on said second slide guide including gearing and threaded shafting for driving said longitudinal slide.

8. The apparatus of claim 7, further comprising a first follower and a second follower, each of said followers having a substantially channel shape, said first follower being formed with a female-threaded guide portion meshing with a male-threaded part of said threaded shafting for the longitudinal slide and including a blank-bored portion in slidable relationship with a blank part of said shafting, a coil spring spacing said followers, said second follower being attached to said second slide guide.

9. The apparatus of claim 1 wherein said welding head comprises three welding torches on a lateral adjusting mechanism which is operatively connected to the end of said longitudinal slide.

10. The apparatus of claim 9 wherein said welding head is operatively connected to the lateral adjusting mechanism through longitudinal adjusting mechanism.

11. The apparatus of claim 10, further comprising a third and a fourth adjusting mechanism, said lateral adjusting mechanism including means for simultaneous, fine adjustment of all the three welding torches as a unit in their lateral position, said longitudinal adjusting mechanism including means for simultaneous fine adjustment of all the three welding torches as a unit in their longitudinal position, said third adjusting mechanism being mounted on said longitudinal adjusting mechanism for adjustment of one of the torches separately including means for adjustment relative to another torch, and said forth adjusting mechanism being mounted on said longitudinal slide and including means for adjustment of a further welding torch relative to said another torch.

12. The apparatus of claim 1, further comprising a pair of roller feelers operativelly arranged substantially and mutually at right angles to each other and pivotably mounted to an end portion of said longitudinal slide, said roller feelers including means for rolling on walls of a pair of substantially perpendicularly and vertically arranged workpieces being welded together.

13. The apparatus of claim 12, further comprising differential gearing and a switching box, said differential gearing operatively connecting said two roller feelers with each other, said switch box comprising two microswitches moveable to on-off positions controlled by action of said differential gearing and including means responsive to signal from said microswitches for controlling the position of said welding head through positional adjustment of said lateral slide.

* * * * *